(12) United States Patent
Park

(10) Patent No.: US 9,860,771 B2
(45) Date of Patent: Jan. 2, 2018

(54) APPARATUS AND METHOD FOR BASE TRANSCEIVER REDUNDANCY IN A WIRELESS COMMUNICATION SYSTEM

(71) Applicant: Samsung Electronics Co., Ltd., Gyeonggi-do (KR)

(72) Inventor: Jung-Kun Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 14/593,462

(22) Filed: Jan. 9, 2015

(65) Prior Publication Data
US 2015/0195723 A1 Jul. 9, 2015

(30) Foreign Application Priority Data

Jan. 9, 2014 (KR) .......... 10-2014-0003010

(51) Int. Cl.
*H04W 4/00* (2009.01)
*H04W 24/04* (2009.01)
*H04W 92/04* (2009.01)
*H04W 88/08* (2009.01)

(52) U.S. Cl.
CPC .......... *H04W 24/04* (2013.01); *H04W 88/085* (2013.01); *H04W 92/04* (2013.01)

(58) Field of Classification Search
None
See application file for complete search history.

(56) References Cited

U.S. PATENT DOCUMENTS

| | | | |
|---|---|---|---|
| 9,578,598 B2* | 2/2017 | Laraqui | H04W 48/20 |
| 2001/0036165 A1* | 11/2001 | Suzuki | H04W 24/00 370/335 |
| 2004/0214608 A1 | 10/2004 | Mostafa et al. | |
| 2007/0177552 A1* | 8/2007 | Wu | H04W 88/08 370/335 |
| 2007/0230328 A1* | 10/2007 | Saitou | H04L 1/22 370/210 |
| 2008/0045157 A1* | 2/2008 | Takahashi | H04L 43/0876 455/67.11 |
| 2009/0131113 A1* | 5/2009 | Shiizaki | H04B 7/0491 455/562.1 |
| 2010/0087227 A1* | 4/2010 | Francos | H03F 1/3247 455/562.1 |
| 2012/0202507 A1* | 8/2012 | Zhang | H04B 1/0003 455/450 |
| 2012/0266152 A1* | 10/2012 | Tang | G06F 8/61 717/168 |
| 2013/0121248 A1* | 5/2013 | Lee | H04W 74/00 370/328 |
| 2013/0136068 A1* | 5/2013 | Johansson | H04W 88/085 370/329 |
| 2013/0303150 A1* | 11/2013 | Li | H04W 36/22 455/418 |

(Continued)

*Primary Examiner* — Bob Phunkulh
(74) *Attorney, Agent, or Firm* — The Farrell Law Firm, P.C.

(57) ABSTRACT

A method and apparatus are provided for connecting Digital Units (DUs) and Radio frequency Units (RUs) of base transceivers in a wireless communication system. The method includes identifying a failed DU of a base transceiver; and linking an RU corresponding to the failed DU to a DU of a different base transceiver which operates normally.

14 Claims, 8 Drawing Sheets

(56) References Cited

U.S. PATENT DOCUMENTS

| | | | |
|---|---|---|---|
| 2014/0126353 A1* | 5/2014 | Xu | H04W 24/04 |
| | | | 370/220 |
| 2014/0155066 A1* | 6/2014 | Guo | H04B 1/74 |
| | | | 455/436 |
| 2014/0161447 A1* | 6/2014 | Graves | H04Q 11/0005 |
| | | | 398/48 |
| 2015/0237571 A1* | 8/2015 | Laraqui | H04W 48/20 |
| | | | 370/332 |

\* cited by examiner

APPARATUS AND METHOD FOR BASE TRANSCEIVER REDUNDANCY IN A WIRELESS COMMUNICATION SYSTEM

PRIORITY

The present application claims priority under 35 U.S.C. §119(a) to Korean Patent Application Serial No. 10-2014-0003010, which was filed in the Korean intellectual Property Office on Jan. 9, 2014, the entire disclosure of which is incorporated herein by reference.

BACKGROUND OF THE INVENTION

1. Field of the Invention

The present invention relates generally to redundancy of base transceiver system.

2. Description of the Related Art

In general, a base transceiver largely includes a Digital Unit (DU) and a Radio frequency Unit (RU). The DU is a digital device for processing a baseband signal, and the RU is an analog device for processing an analog radio signal.

The base transceiver can be operated in a redundancy scheme or a simplification scheme. The redundancy scheme doubles a board or a unit of the DU and switches the failed board or unit. However, since the redundancy scheme increases system cost, most mobile communication base transceiver systems utilize simplified scheme with the single board or unit.

FIGS. 1A and 1B illustrate a base transceiver including DUs and RUs connected to a switch in a conventional wireless communication system.

Referring to FIG. 1A, a first DU 103, a second DU 105, a first RU 109 linked to the first DU 103, and a second RU 111 linked to the second DU 105 are connected to a switch 107. The first DU 103 and the second DU 105 are digital devices in the base transceiver for processing the baseband, and the first RU 109 and the second RU 111 are analog devices for processing analog radio signals of RF. Typically, the base transceiver includes the DU and the RU, which may be integrated as a single unit or separated by a certain distance.

When the first DU 103 and the second DU 105 are in a normal operation 101, the first RU 109 and the second RU 111 linked to the first DU 103 and the second DU 105 via the switch 107 are successfully connected to provide normal service. However, when the second DU 111 has a fault, in operation 113, the first RU 109 linked to the first DU 103 via the switch 107 continues to operate normally, but the second RU 111 linked to the second DU 105 via the switch 107 experiences a service interruption.

FIG. 2 illustrates a base transceiver service interruption when a second DU fails among DUs and RUs connected to a switch and in a conventional wireless communication system.

Referring to FIG. 2, a first base transceiver provides a service coverage 201, a second base transceiver provides a service coverage 203, a third base transceiver provides a service coverage 205, and a fourth base transceiver provides a service coverage 207. When the second DU of the second base transceiver fails, the service of the second RU linked to the second DU via the switch is interrupted, thereby interrupting the service of the second base transceiver, as identified by in 209.

As discussed above, when a main processor or channel card of a DU fails in a simplified scheme base transceiver system, an RU connected to the failed component cannot provide service, and thus, the service is interrupted.

SUMMARY OF THE INVENTION

The present invention has been made to address at least the problems and/or disadvantages described above and to provide at least the advantages described below.

Accordingly, an aspect of the present invention is to provide an apparatus and a method for base transceiver redundancy in a wireless communication system.

Another aspect of the present invention is to provide an apparatus and a method for handling DU failure in a wireless communication system.

Another aspect of the present invention is to provide an apparatus and a method for combining RU signals of different base transceivers in a wireless communication system.

Another aspect of the present invention is to provide an apparatus and a method for multiplexing RU signals of different base transceivers in a wireless communication system.

In accordance with an aspect of the present invention, a redundancy apparatus of a base transceiver is provided for connecting DUs and RUs in a wireless communication system. The redundancy apparatus includes a connector configured to link the DUs and the RUs; and a controller configured to control the connector to link an RU corresponding to a failed DU of the base transceiver to a DU of a different base transceiver that normally operates, when the DU of the base transceiver fails.

In accordance with another aspect of the present invention, a method is provided for connecting DUs and RUs in a wireless communication system. The method includes identifying a failed DU of a base transceiver; and linking an RU corresponding to the failed DU to a DU of a different base transceiver which operates normally.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components and structures.

DETAILED DESCRIPTION OF EMBODIMENTS OF THE INVENTION

The following description with reference to the accompanying drawings is provided to assist in a comprehensive understanding of various embodiments of the present invention as defined by the claims and their equivalents. Although the description includes some specific details to assist in that understanding, these are to be regarded as merely exemplary. Accordingly, those of ordinary skill in the art will recognize that various changes and modifications of the embodiments described herein can be made without departing from the scope and spirit of the invention, in addition, descriptions of well-known functions and constructions may be omitted for clarity and conciseness.

The terms and words used in the following description and claims are not limited to their meanings, but are merely used to enable a clear and consistent understanding of the invention. Accordingly, it should be apparent to those skilled in the art that the following description of certain embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In accordance with an embodiment of the present invention, a base transceiver system redundancy method is provided for minimizing service interruptions when a DU fails among DUs and RUs of the base transceiver in a wireless communication system. That is, a redundancy apparatus and method is provided for connecting DUs and RUs of a base transceiver in a wireless communication system.

Figure 1A:
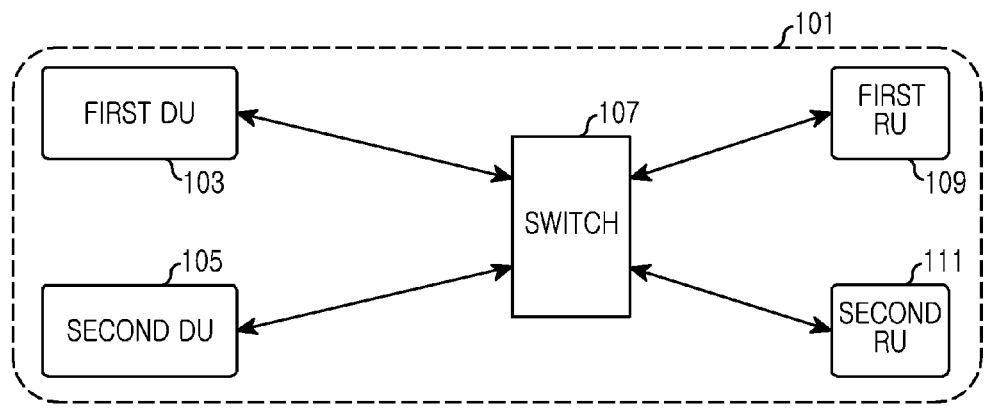
FIGS. 1A and 1B illustrate base transceivers including DUs and RUs connected to a switch in a conventional wireless communication system.
Figure 1B:
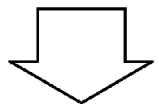
Figure 1B:
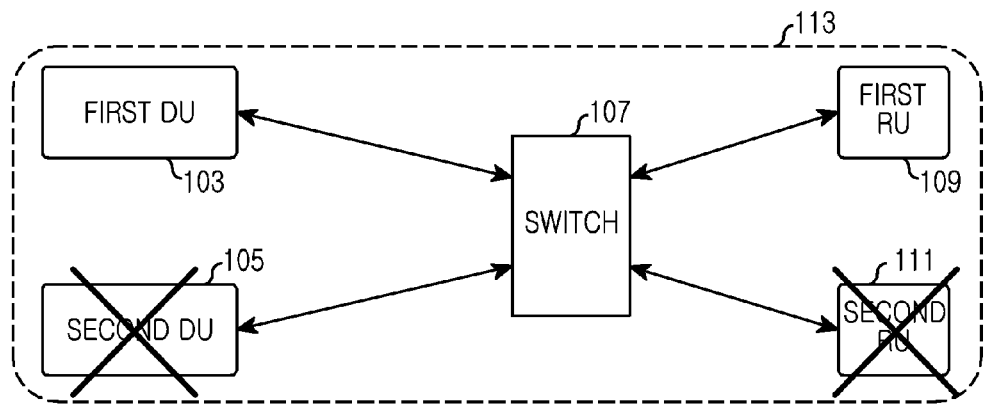
Figure 2:
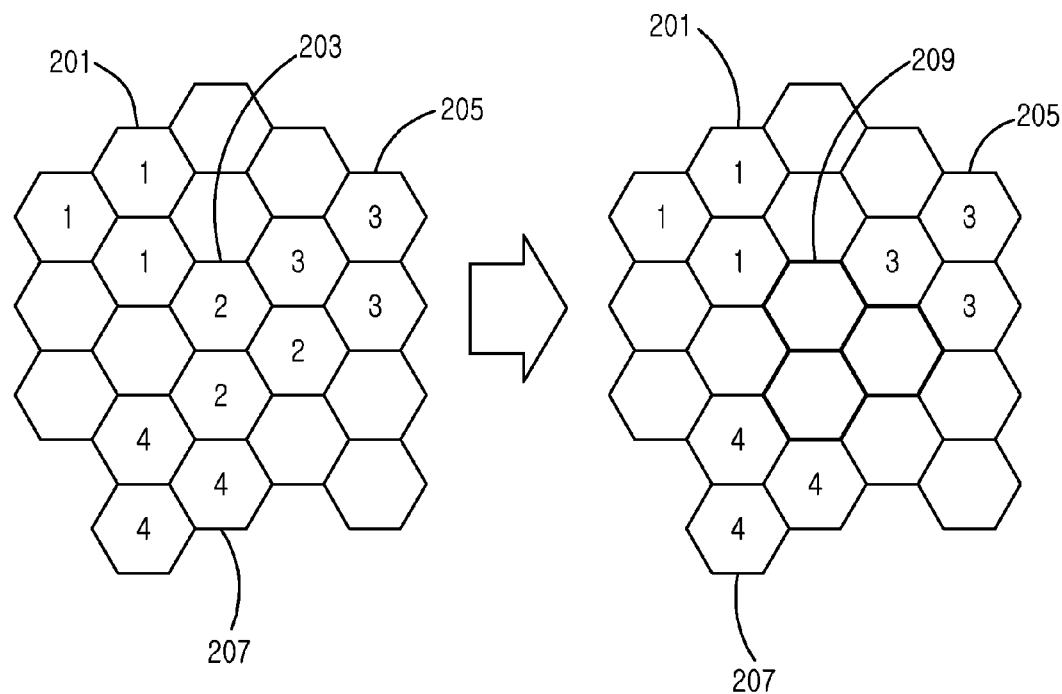
FIG. 2 illustrates base transceiver service interruption when a second DU fails among DUs and RUs connected to a switch and in a conventional wireless communication system.
Figure 3:
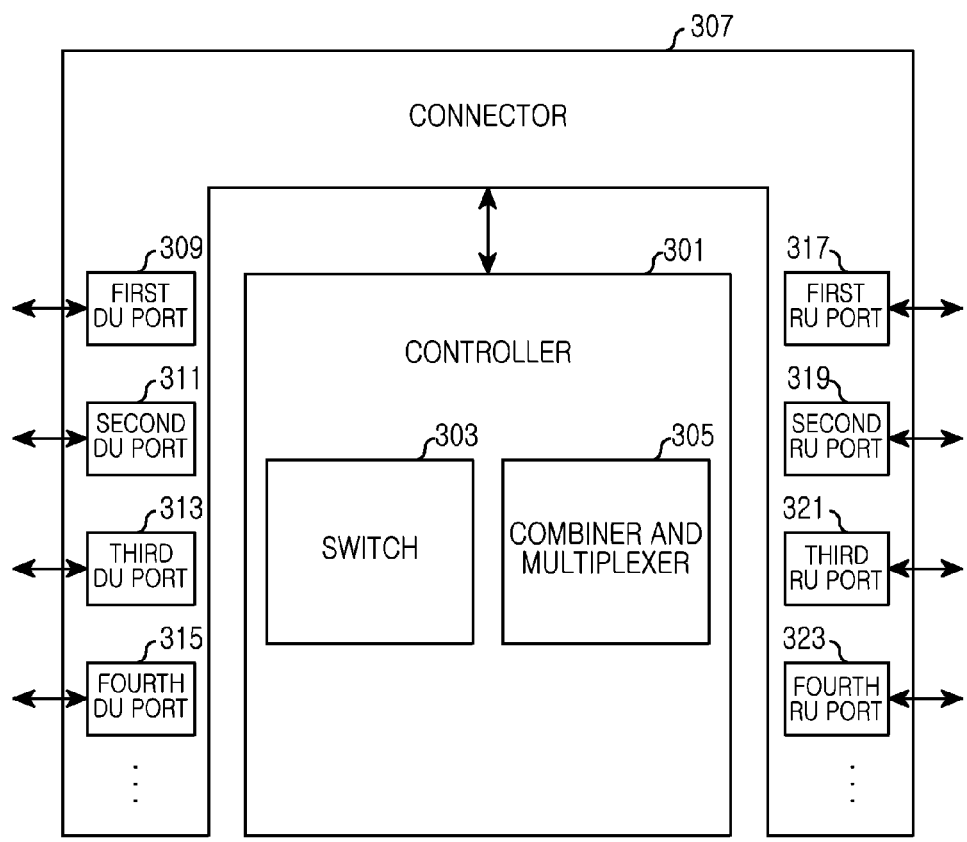
FIG. 3 illustrates a redundancy apparatus in a wireless communication system according to an embodiment of the present invention.

FIG. 3 illustrates a redundancy apparatus in a wireless communication system according to an embodiment of the present invention.

Referring to FIG. 3, a redundancy apparatus includes a controller 301 and a connector 307. The controller 301 includes a switch 303 and a combiner and multiplexer 305. The connector 307 includes DU ports 309 to 315 and RU ports 317 to 323.

The controller 301 receives, from a management server, a signal indicating a DU failure, notifying at least one another base transceiver near a base transceiver of the DU failure, and informing at least one DU of the at least one another base transceiver.

Upon receiving the signals, the controller 301 recognizes the DU failure and a normally operating neighbor base transceiver selection among the DUs connected to the connector 307. For example, the DU failure and the normally operating neighbor base transceiver selection are conducted by a high-level management server according to a preset algorithm. When receiving a signal of the DU failure and a normally operating neighbor base transceiver selection from the management server, the controller 301 controls an RU linked to the failed DU to interwork with a DU of the selected normally operating neighbor base transceiver.

The connector 307 connects the DUs and the RUs through the DU ports 309 to 315 and the RU ports 317 to 323. The connector 307 exchanges signals with DUs and RUs of different base transceivers. Although FIG. 3 illustrates the four DU ports 309 to 315 and the four RU ports 317 to 323, more DU ports and RU ports can be included therein.

Although not illustrated in FIG. 3, the connector 307 may also include a communication module for sending and receiving the signals.

When the switch 303 duplicates a received transmit signal, the controller 301 sends the transmit signal to the RUs through the connector 307.

The combiner and multiplexer 305 generates a combined signal by combining the received signals of the RUs, or generates a multiplexed signal by multiplexing the signals. The received signal includes a data channel I/Q signal and a control channel signal. The combiner and multiplexer 305 combines the data channel I/Q signal and multiplexes the control channel signal. The controller 301 sends the combined signal or the multiplexed signal to at least one normal DU through the connector 307.

Even when two or more different RUs are connected to a single DU, the combiner and multiplexer 305 combines the data channel I/Q signal to serve one cell, i.e., to connect one cell.

The combiner and multiplexer 305 adds digital signals of data channels. For example, when digital signals of an RU of a selected base transceiver and an RU linked to a failed DU are '1100110010010101' and '0010101000101100', respectively, the two digital signals are added to produce '1111011011000001' and then provided to a selected base transceiver DU. Alternatively, the combination can be performed using other suitable methods.

Because a control channel is a control signal between a selected base transceiver DU and a selected base transceiver RU, and an RU linked to a failed DU, the control channels are multiplexed. While the signals between the DUs and the RUs are sequentially transmitted using SERializer DESerializer (SERDER), they should be generated as a control message for multiplexing. Accordingly, the combiner and multiplexer 305 generates a control channel signal received at the RU of the selected base transceiver and the RU linked to the failed DU, based on a control protocol. Thereafter, the combiner and multiplexer 305 time-multiplexes the control protocol signals of the RU of the selected base transceiver and the RU linked to the failed DU, in order to send the signal to the DU of the selected base transceiver. For example, when receiving 'a, b, c, d' from an RU of a selected base transceiver and 'A, B, C, D' from an RU linked to a failed DU, the combiner and multiplexer 305 multiplexes them to 'a, A, b, B, c, C, d, D' or 'a, b, A, B, c, d, C, D' in time and sends the multiplexed signal to a selected base transceiver DU. Alternatively, the multiplexing can be performed using another suitable pattern than the above pattern.

Figure 4A:
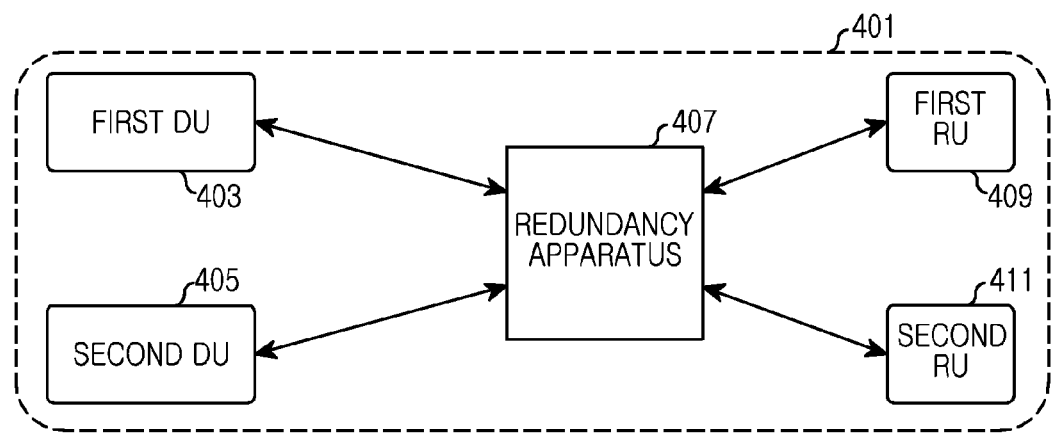
FIGS. 4A and 4B illustrate operations between DUs and RUs of a redundancy apparatus in a wireless communication system according to an embodiment of the present invention.
Figure 4B:
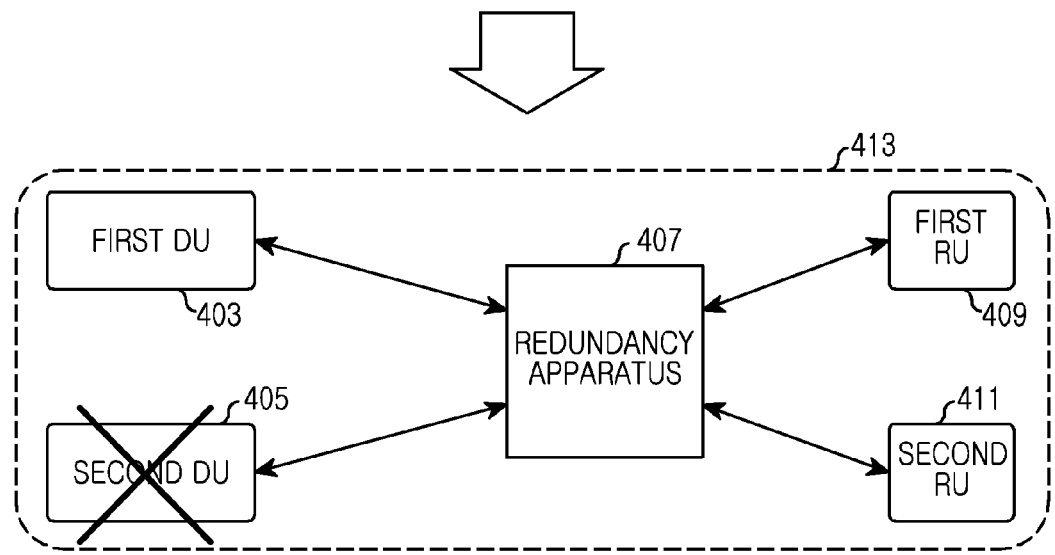

FIGS. 4A and 4B illustrate operations between DUs and RUs of a redundancy apparatus in a wireless communication system according to an embodiment of the present invention.

Referring to FIG. 4A, the redundancy apparatus is connected to a first DU 403 and a second DU 405 in a normal operation 401 of a base transceiver, a first RU 409 linked to the first DU 403, and a second RU 411 linked to the second DU 405. Two or more DUs and two or more RUs can be equipped. As described above, the first DU 403 and the second DU 405 are digital devices of the base transceiver for processing the baseband, and the first RU 409 and the second RU 411 are analog devices for processing the analog radio signals of the RF. Further, the base transceiver includes the DU and the RU, which can be integrated or separated by a certain distance.

When the second DU 405 has a fault 413, as illustrated in FIG. 49, the redundancy apparatus 407 receives the transmit signal of the first DU 403 and duplicates the received signal through the switch. For example, a high-level management server (not shown) determines the failure of the second DU 405, when no message or signal is received from the second DU 405 during a certain time, and then notifies the redundancy apparatus 407 of the failure. The redundancy apparatus 407 sends the duplicated signal to the first RU 409 and the second RU 411. The redundancy apparatus 407 divides and processes the signals received from the first RU 409 and the second RU 411, into the data channel I/Q signal and the control channel signal. The redundancy apparatus 407 combines the data channel signals, and multiplexes and provides the control channel signals to the first DU 403, as described above with reference to FIG. 3.

Figure 5:
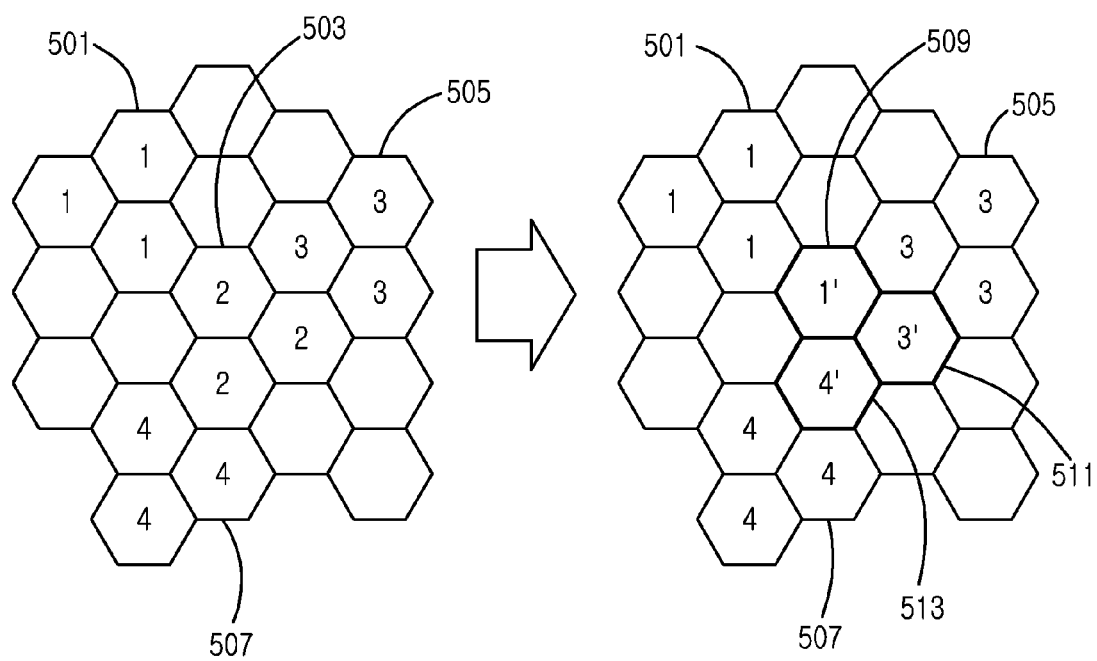
FIG. 5 illustrates service being maintained by changing a cell according to a DU failure in a wireless communication system according to an embodiment of the present invention.

FIG. 5 illustrates service being maintained by changing a cell from a particular failed base transceiver to a neighbor base transceiver in a wireless communication system according to an embodiment of the present invention.

Referring to FIG. 5, a first base transceiver provides a service coverage 501, a second base transceiver provides a service coverage 503, a third base transceiver provides a service coverage 505, and a fourth base transceiver provides a service coverage 507. When a second DU of the second base transceiver fails, a second RU of the second base transceiver maintains the service by interworking with a first DU of the first base transceiver 509, a third DU of the third base transceiver 511, and a fourth DU of the fourth base transceiver 513 via the redundancy apparatus.

For example, referring back to FIG. 4B, when the second DU 405 fails, the redundancy apparatus 407 receives the transmit signal of the first DU 403 and duplicates the received signal through a switch. For example, a high-level management server determines the failure of the second DU 405 when no message or signal is received from the second DU 405 during a certain time, and then notifies the redundancy apparatus 407 of the failure. The redundancy apparatus 407 sends the duplicated signal to the first RU 409 and the second RU 411. The redundancy apparatus 407 divides and processes the signals received from the first RU 109 and the second RU 411, into the data channel I/Q signal and the control channel signal. The redundancy apparatus 407 combines the data channel signals, and multiplexes and provides the control channel signals to the first DU 403, as described above with reference to FIG. 3.

The above-described switching, combining, and multiplexing of the redundancy apparatus can be equally applied to the second RU, the third DU, and the fourth DU.

Figure 6:
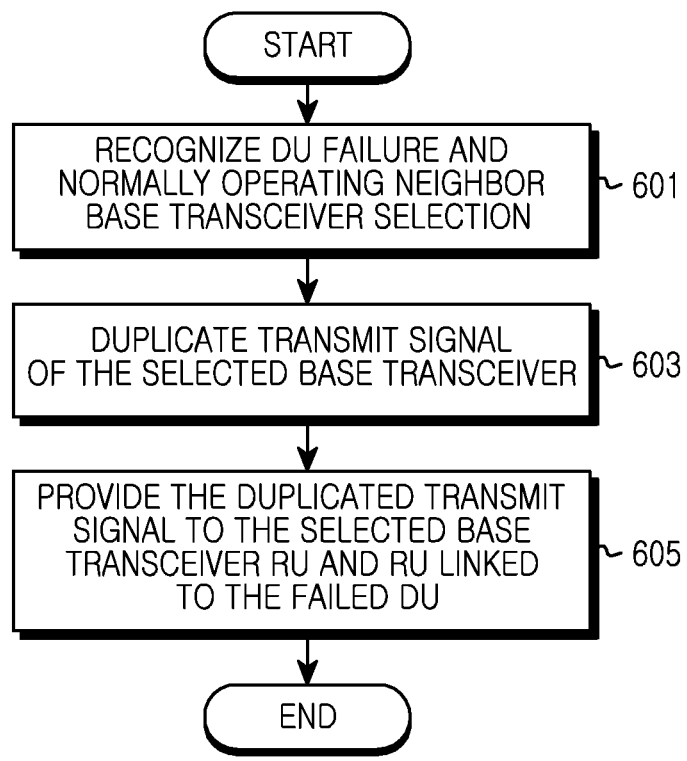
FIG. 6 is a flowchart illustrating a method for processing a transmit signal in a redundancy apparatus according to an embodiment of the present invention.

FIG. 6 is a flowchart illustrating a method for processing a DU transmit signal in a redundancy apparatus according to an embodiment of the present invention.

Referring to FIG. 6, the redundancy apparatus recognizes a DU failure and a normally operating neighbor base transceiver selection in step 601. For example, a high-level management server determines a failure of a DU when no message or signal is received from the DU during a certain time, and then notifies the redundancy apparatus of the failure. Further, the high-level management server selects the normally operating neighbor base transceiver, based on a preset algorithm, and notifies the redundancy apparatus of the selection. Thereafter, the redundancy apparatus links a DU of the selected base transceiver and an RU of the failed DU.

In step 603, the redundancy apparatus duplicates the transmit signal of the normally operating neighbor base transceiver DU.

In step 605, the redundancy apparatus provides the duplicated transmit signal to the normally operating neighbor base transceiver RU and the RU previously linked to the failed DU. As illustrated in FIG. 4B, the duplicated transmit signal is provided to the RUs through a connector.

Figure 7:
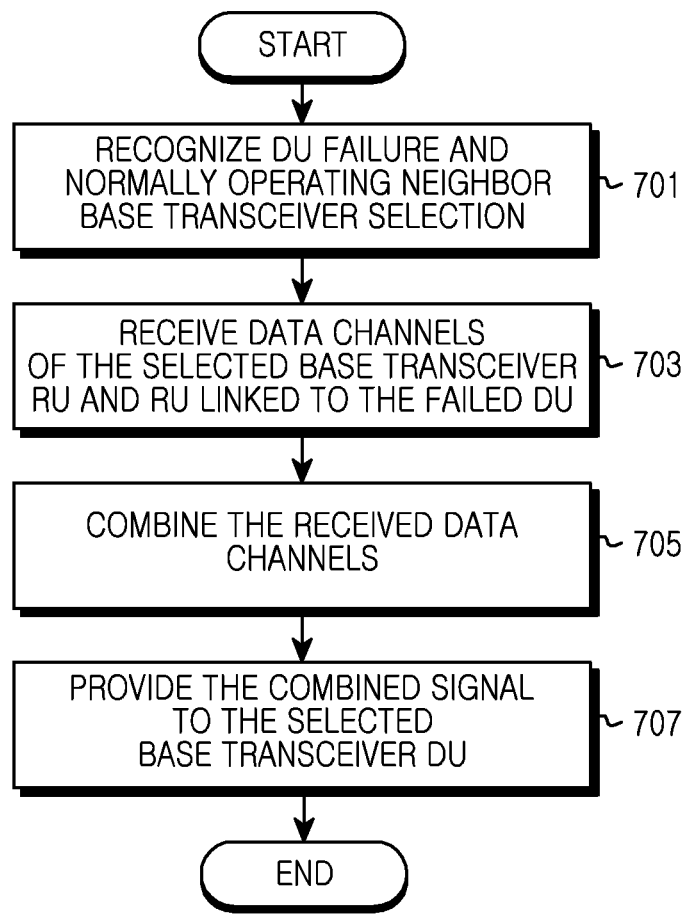
FIG. 7 is a flowchart illustrating a method for combining received signals in a redundancy apparatus according to an embodiment of the present invention.

FIG. 7 is a flowchart illustrating a method for combining RU received signals in a redundancy apparatus according to an embodiment of the present invention.

Referring to FIG. 7, the redundancy apparatus recognizes a DU failure and a normally operating neighbor base transceiver selection in step 701. For example, a high-level management server determines the DU failure when no message or signal is received from the DU for a certain time, and then notifies the redundancy apparatus of the DU failure. Further, the high-level management server selects the normally operating neighbor base transceiver based on a preset algorithm, and then notifies the redundancy apparatus of the neighbor base transceiver selection. Thereafter, the redundancy apparatus links the DU of the selected base transceiver and an RU of the failed DU.

In step 703, the redundancy apparatus receives the data channels, e.g., I/Q signals, of the RU of the selected base transceiver, and the RU previously linked to the failed DU.

In step 705, the redundancy apparatus combines the received data channel I/Q signals, e.g., as described with reference to FIG. 3 above.

In step 707, the redundancy apparatus provides the combined signal to the selected base transceiver DU.

Figure 8:
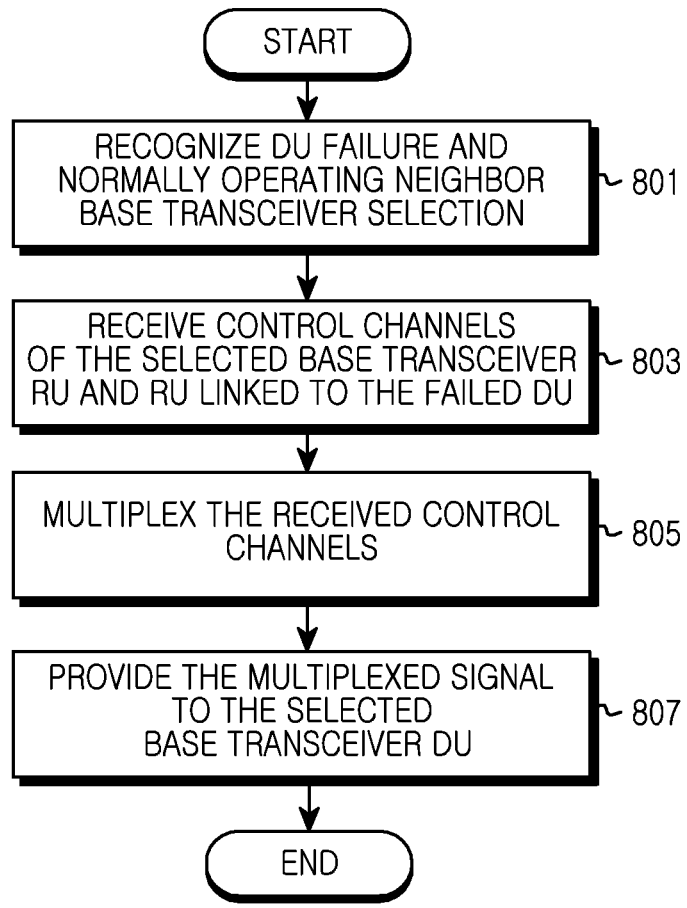
FIG. 8 is a flowchart illustrating a method for multiplexing received signals in a redundancy apparatus according to an embodiment of the present invention.

FIG. 8 is a flowchart illustrating a method for multiplexing RU received signals in a redundancy apparatus according to an embodiment of the present invention.

Referring to FIG. 8, the redundancy apparatus recognizes a DU failure and a normally operating neighbor base transceiver selection in step 801. For example, a high-level management server determines the DU failure when no message or signal is received from the DU during a certain time, and then notifies the redundancy apparatus of the DU failure. Further, the high-level management server selects the normally operating neighbor base transceiver based on a preset algorithm, and notifies the redundancy apparatus of the neighbor base transceiver selection. Thereafter, the redundancy apparatus links a DU of the selected base transceiver and an RU of the failed DU.

In step 803, the redundancy apparatus receives the control channels of an RU of the selected base transceiver, and the RU previously linked to the failed DU.

In step 805, the redundancy apparatus multiplexes the received control channels, e.g., as described above with reference to FIG. 3.

In step 807, the redundancy apparatus provides the multiplexed signal to the DU of the selected base transceiver.

As described above, even when a simplified scheme base transceiver DU fails in a mobile communication base transceiver system, a service interruption can be minimized by switching an RU linked to the failed DU to an RU of a neighbor base transceiver.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention. Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A redundancy apparatus in a wireless communication system, the redundancy apparatus comprising:
    a connector configured to link a digital unit (DU) and a radio unit (RU) of each base transceiver; and
    a controller configured to:
        receive, from a server, a signal for indicating that a first DU of a first base transceiver is failed, the signal being transmitted in response to detecting that no message or signal is transmitted from the first DU during a certain time,
        control the connector to link a first RU corresponding to the failed first DU, to a second DU of a second base transceiver that operates normally,
        receive a first control signal from the first RU and a second control signal from a second RU,
        generate a control signal by multiplexing the first control signal and the second control signal, and
        provide the generated control signal to the second DU of the second base transceiver.

2. The redundancy apparatus of claim 1, wherein the signal further indicates the second base transceiver which is determined as a normally operating neighboring transceiver by the server.

3. The redundancy apparatus of claim 1, wherein the controller is further configured to:
    generate a first transmit signal by duplicating a second transmit signal of the second DU of the second base transceiver;
    provide the first transmit signal to the first RU; and
    provide the second transmit signal to the second RU.

4. The redundancy apparatus of claim 1, wherein the controller is further configured to:
    receive a first data signal from the first RU and a second data signal from the second RU;
    generate a data signal by combining the first data signal and the second data signal to serve one cell; and
    provide the generated data signal to the second DU of the second base transceiver.

5. The redundancy apparatus of claim 4, wherein the first data signal and the second data signal are combined by adding the first data signal and the second data signal.

6. The redundancy apparatus of claim 1, wherein the first control signal and the second control signal are multiplexed in time.

7. The redundancy apparatus of claim 1, wherein the first RU is only linked to the failed first DU according to the first base transceiver operated as a simplification scheme before the first RU being linked to the second DU.

8. A method for operating a redundancy apparatus in a wireless communication system, the method comprising:
    receiving, from a server, a signal for indicating that a first DU of a first base transceiver is failed, the signal being transmitted in response to detecting that no message or signal is transmitted from the first DU during a certain time;
    linking a first RU corresponding to the failed first DU, to a second DU of a second base transceiver that operates normally;
    receiving a first control signal from the first RU and a second control signal from a second RU;
    generating a control signal by multiplexing the first control signal and the second control signal; and
    providing the generated control signal to the second DU of the second base transceiver.

9. The method of claim 8, wherein the signal further indicates the second base transceiver that is determined as a normally operating transceiver by the server.

10. The method of claim 8, further comprising:
    generating a first transmit signal by duplicating a second transmit signal of the second DU of the second base transceiver;
    providing the first transmit signal to the first RU; and
    providing the second transmit signal to the second RU.

11. The method of claim 8, wherein the first RU is only linked to the failed first DU according to the first base transceiver operated as a simplification scheme before the first RU being linked to the second DU.

12. The method of claim 8, further comprising:
    receiving a first data signal from the first RU and a second data signal from the second RU;
    generating a data signal by combining the first data signal and the second data signal to serve one cell; and
    providing the generated data signal to the second DU of the second base transceiver.

13. The method of claim 12, wherein the first data signal and the second data signal are combined by adding the first data signal and the second data signal.

14. The method of claim 8, wherein the first control signal and the second control signal are multiplexed in time.

* * * * *